June 15, 1965 J. H. FRAKES 3,189,818
PORTABLE INSULATION TESTING EQUIPMENT ADAPTABLE FOR CONVERSION
FROM STRAIGHT TO INVERTED SCHERING-BRIDGE OPERATION
Filed June 14, 1962 5 Sheets-Sheet 1

STRAIGHT BRIDGE

HIGH VOLTAGE

INVERTED BRIDGE

HIGH VOLTAGE

STRAIGHT BRIDGE

INVERTED BRIDGE

June 15, 1965  J. H. FRAKES  3,189,818
PORTABLE INSULATION TESTING EQUIPMENT ADAPTABLE FOR CONVERSION
FROM STRAIGHT TO INVERTED SCHERING-BRIDGE OPERATION
Filed June 14, 1962  5 Sheets-Sheet 5

United States Patent Office 3,189,818
Patented June 15, 1965

3,189,818
PORTABLE INSULATION TESTING EQUIPMENT ADAPTABLE FOR CONVERSION FROM STRAIGHT TO INVERTED SCHERING-BRIDGE OPERATION
James H. Frakes, Penn Township, Allegheny County, Pa., assignor to Dielectric Instrument Corporation, Pittsburgh, Pa., a corporation of Pennsylvania
Filed June 14, 1962, Ser. No. 202,463
4 Claims. (Cl. 324—54)

This invention relates generally to portable-type insulation testing equipments in general, and, more particularly, to an improved portable-type insulation testing equipment of the Schering-bridge type, which is readily convertible from the conventional laboratory use (i.e., not inverted, but with ground at the instrument end) to "inverted" operation, to permit testing capacitors having one terminal grounded.

A general object of my invention is to provide an improved, light-weight, portable dielectric testing equipment of the Schering-bridge type, which may be quickly manipulated from "straight" use to "inverted" use for adapting the testing equipment to a variety of applications, both in the laboratory and in the field, adjacent to installed equipment.

As well known by those skilled in the art, it is desirable to periodically determine whether a terminal bushing is reliable or defective by measuring the energy loss through, and the charging current or capacitance of, the insulation when alternating voltage of known value is applied to the insulation in the field, i.e., the location where it is set up for use. The power factor is a good indication of the condition of insulation, inasmuch as the power factor of the insulation does not depend upon the size of the test specimen, but only upon its quality as insulation. There would be no energy loss whatsoever in a perfect insulator, and, as a consequence, a perfect insulator would have zero power factor. Thus, the power factor of the insulation is indicative of its electrical insulation qualities. The power factor will indicate the dielectric losses and show the general condition of the insulation. The capacitance measurement is valuable to show if a weakness exists in any layer of the bushing.

Conditions which will lead to an increase in the energy loss through the terminal bushing, and hence an increase in the value of the power factor, will be the seepage of moisture through gaskets and joints into the bushing to cause deterioration therein, slight leakage currents across dirty or contaminated surfaces interiorly and exteriorly of the bushing casing, voids in the condenser winding which may char over long periods of time, and leakage through the oil exteriorly of the bushing. All these leakage currents are in parallel between the energized conductor stud passing through the bushing and the grounded supporting flange. Thus, if the foregoing conditions are ignored, or not periodically checked, the breakdown resistance of the insulation may be lowered to such an extent that the bushing may fail in service.

It is, accordingly, an object of the present invention to provide an improved portable-type testing equipment adapted for determining the insulating qualities of high-tension terminal bushings, transformer coils and the like, which is capable of giving a reading of the capacitance and power factor of a test specimen in the field, as distinguished from removing the bushing from the apparatus with which it is associated, and taking it to the laboratory for testing.

For some years, equipment for testing the insulation qualities of terminal bushings in the field has been available, but it has been quite complicated in character, and although capable of being transported by truck to the field, it was not as readily portable or capable of as easy manipulation as would be desirable. It is, therefore, a further object of the present invention to provide a testing set for testing insulation and dielectrics which is more readily portable than equipment heretofore available, but which sacrifices none of the accuracy or practical range of measurement now obtainable.

Test bridges, operating on the Schering-bridge principle, have for a long time been used especially on production-line work to measure capacitance and losses in A.C. electrical insulation, such as bushings, transformer windings, circuit-breaker assemblies, etc. The portable testing apparatus of the present invention operates under the Schering-bridge principle, but is a distinct improvement over devices heretofore used in that it is designed to be easily portable and ideal for use where the instrument must be moved from one location to another in making field measurements. Whereas former so-called portable instruments were bulky and sensitive to shock, so that they required a special truck in which they were permanently mounted on shock-absorbing materials for transportation, my device can be disconnected from a test operation in one location, separated into two component units, each of which can be easily carried by a single operator, placed in the trunk of an ordinary passenger car, and transported to the next test location with facility. Construction of my testing device is rugged enough so that any ordinary means of transportation will not damage the testing instrument.

Taking down or setting up the portable test instrument can be done in a few minutes. Separation of the test instrument into two component parts reduces the weight of each component part, and also, importantly, simplifies transportation between tests. Essentially, the portable testing instrument of the present invention consists of two parts, namely: an upper instrument unit, or section, which contains the measuring instruments, and a lower power-supply unit, or section, that contains the power supply, standard condenser, humidity-control heater, and high-voltage switching arrangements. In addition, there is a set of shielded cables for interconnection between the two units and attachment to the test specimen.

Each of the two units is arranged with plug-in terminal boards for connecting, by means of the special cables, from the lower power-supply unit to the instrument unit, and to the apparatus to be tested. By means of these shielded cables and plug-in terminals, the instrument can be connected either for use as a straight bridge, or as an inverted bridge. The inverted-bridge connection is especially useful for testing insulation attached to apparatus where one side of the insulator is solidly grounded. These tests can be made with the inverted-bridge connections without removing the insulators, such as terminal bushings, from the associated apparatus, whereas to use a straight bridge connection, the insulators must be removed and insulated from ground.

All parts of the bridge instruments and the cables are shielded so that stray currents are by-passed to ground, and only the current passing through the insulation to be measured reaches the measuring instrument.

Another very important feature of the improved testing instrument of the present invention comprises the use of an improved bridge-balancing indicator consisting of a sensitive amplifier, the output of which is indicated on a sensitive D.C. milliammeter. The amplifier is tuned for maximum sensitivity to 60 cycles, so that harmonics do not affect the balance. This balance indicator is extremely sensitive so that a very fine balance can be obtained, even at low applied voltage.

An important advantage of the foregoing is that the high sensitivity of the balance indicator makes it practical to use a lower voltage than was considered possible in previous bridge designs. Since capacitance and power factor are generally independent of voltage, there is an advantage in using a relatively low voltage in that the units can be made smaller and lighter. As a result, they are much more easily portable for relocation. In the improved bridge instrument of the present invention there are employed test voltages up to 5,000 volts, which are supplied by the lower power-supply unit. These voltages are generally sufficient for nearly all uses of the bridge. However, should it be desirable to test certain apparatus at much higher voltages to determine incipient breakdown, etc., this bridge can be used as a straight bridge at any desired higher voltage by merely using an external voltage source and an external standard capacitor. Special cables for this conversion procedure connect to the existing plug-in terminal boards.

In the design of the test instrument of the present invention, special attention has been given to ease of servicing. Whereas in most older units, the entire unit must be disassembled if any part needs servicing, in the instrument of my invention the entire instrument section is mounted so that it can be removed from its case as a unit by disconnecting a clip connection and a few plug-in leads, that can be easily reached by a door in the bottom of the instrument box, and then lifting the whole unit out. Legs are provided so that this unit, when removed, can be set on a test bench, exposing all parts to view, and in easy reach for inspection or repairs.

Accordingly, additional objects of the present invention are to provide an improved portable-type dielectric testing instrument adaptable for ready servicing, capable of rapid conversion from straight to inverted-bridge use, suitable for quick takedown and setup, with lightweight parts capable of transportation in a passenger car by a single operator.

Further objects and advantages will readily become apparent upon a reading of the following specification, taken in conjunction with the drawings, in which.

Figure 1:
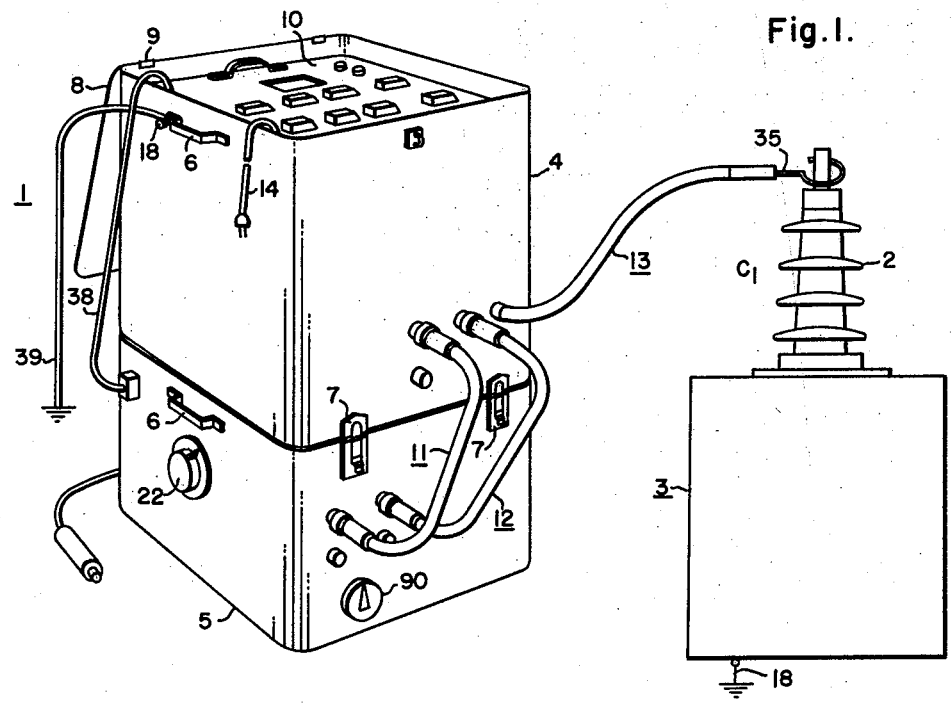
FIG. 1 is a perspective view of the testing instrument of the invention connected for inverted-bridge use in connection with the terminal bushing of a potential transformer.
Figure 6:
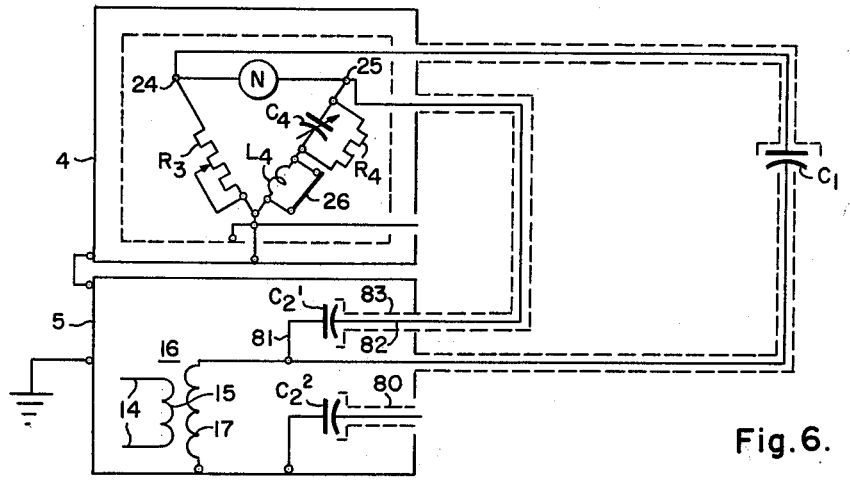
Figure 7:
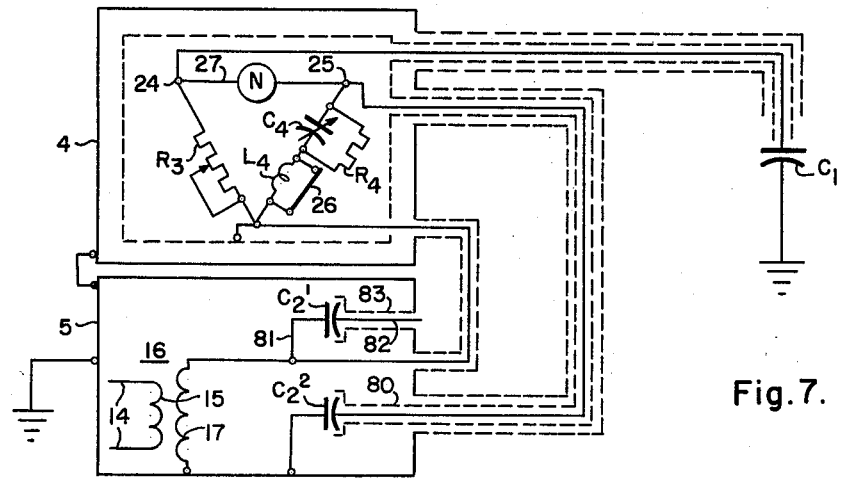
Figure 8:
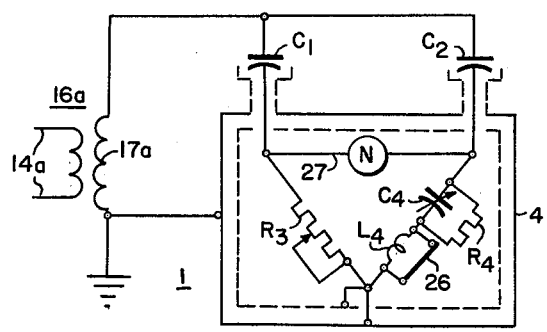
Figure 9:
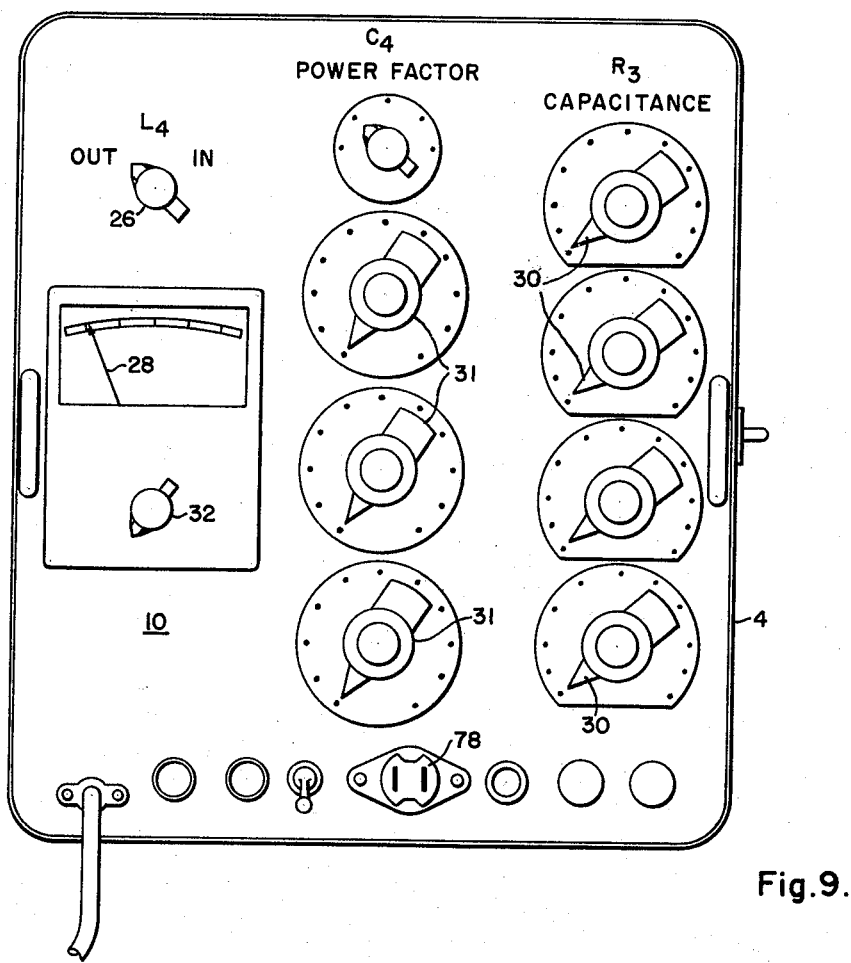
Figure 10:
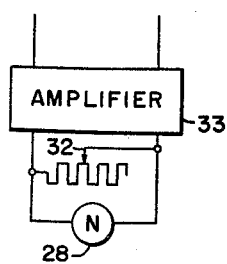

FIGS. 6 and 7, respectively, schematically illustrate straight and inverted Schering-bridge connections used with a modified testing construction using two separate standard condensers instead of one standard condenser;

FIG. 8 schematically illustrates a possible reconnection variation of the test instrument of FIG. 1 utilizing an external high-voltage source and also an external standard no-loss condenser, the figure also illustrating use of the instrument for straight Schering-bridge use with a test specimen;

FIG. 9 is an enlarged plan view of the switching panel; and,

FIG. 10 illustrates, fragmentarily, the amplifier-type null indicator, as associated with the measuring instruments.

Figure 4:
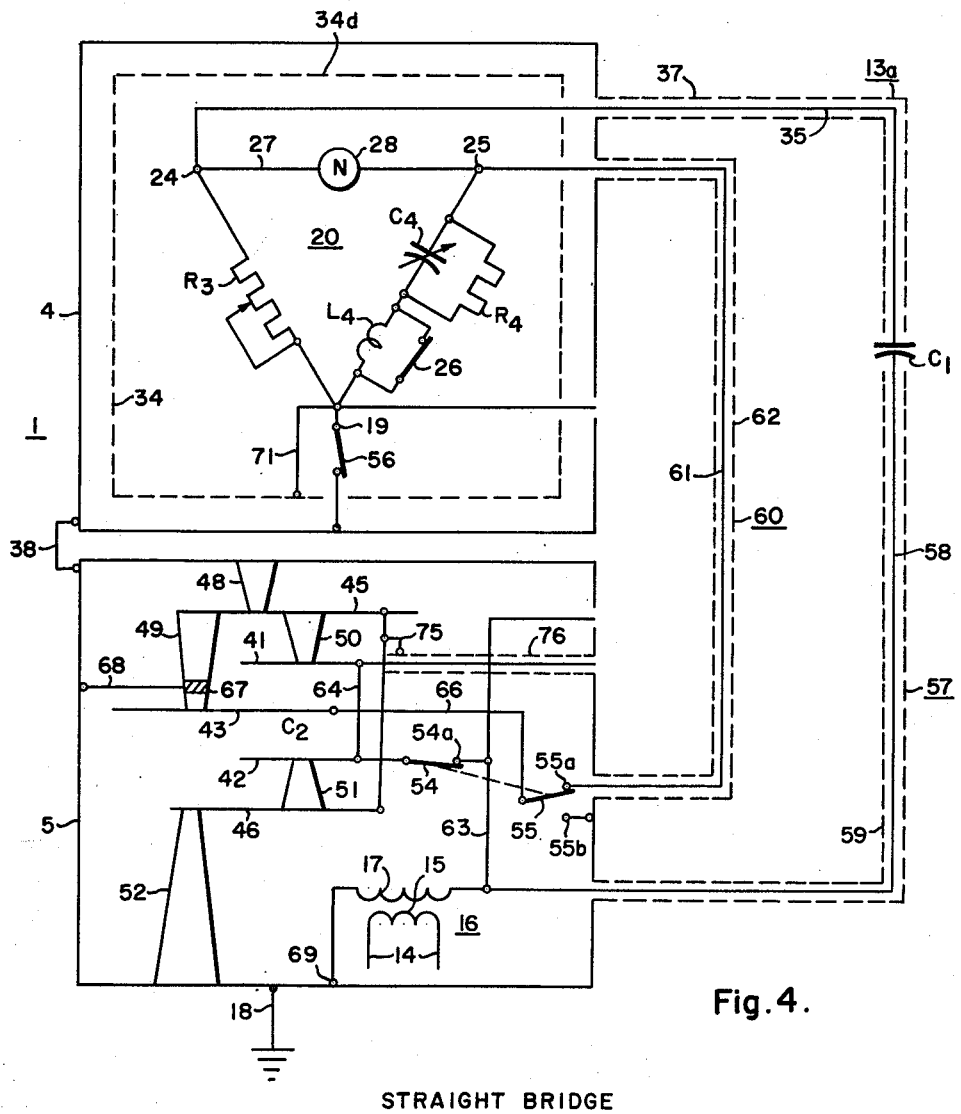
FIG. 4 is a schematic showing of the circuit connections of the test instrument adapted for straight-bridge use.

Referring to the drawings, and more particularly to FIG. 1 thereof, the reference numeral 1 generally designates a portable-type Schering-bridge dielectric testing instrument, capable of rapid conversion, by means of shielded cables, from inverted-bridge use, as shown, to straight-bridge use, as shown in FIG. 4 of the drawings.

As shown in FIG. 1, the instrument 1 is shown connected for inverted-bridge use with a terminal bushing 2 of a potential transformer 3. It will be apparent that the dielectric testing instrument 1 comprises an upper instrument section 4 and a lower power-supply section 5. Each section 4, 5 is provided with handles 6 for ready carrying of the individual units 4, 5. Detachable clamps 7 permit the ready alignment of the two sections 4, 5 when in operating use, but may be unfastened to permit the individual carrying of the separate units 4, 5. As shown, the latter are of lightweight construction and may easily be placed in the trunk compartment of an ordinary passenger car by a single operator.

Figure 3:
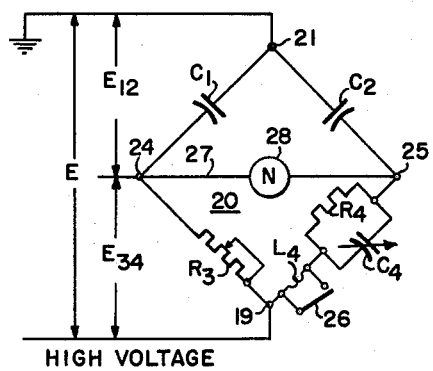
FIG. 3 is a diagrammatic view of an inverted Schering-bridge measuring circuit.
Figure 5:
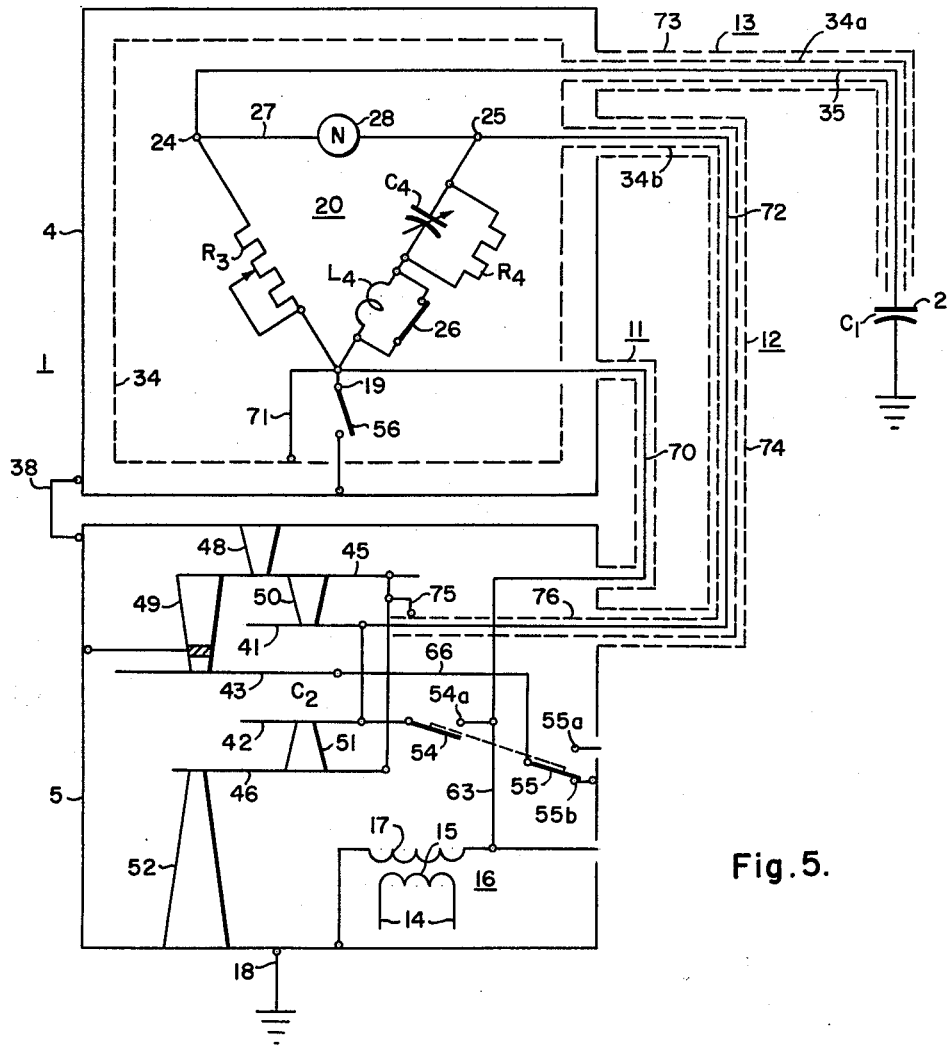
FIG. 5 is another schematic showing of the circuit connections of the test instrument of the present invention adapted for inverted-bridge use.

A top cover 8 is hinged, as at 9, to one side of the upper section 4; and when the cover 8 is swung to one side, as shown, the operator is permitted to view an upper switching panel 10, shown more clearly in the enlarged view of FIG. 9. Plug-in type shielded cables 11–13 permit the interconnection of the two units 4, 5 and also connection to the test specimen 2. An energizing cord 14 for energizing the low-tension winding 15 of a step-up transformer 16, may be used with any convenient voltage source, such as 115 volts, as shown in FIG. 5. The high-tension winding 17, which may be of the order of 5,000 volts in the improved instrument of the present invention, has one side thereof grounded, as at 18, and the other side connected to a first junction 19 of a bridge circuit 20, the opposite or second junction 21 (FIG. 3) of which is grounded. Attention is directed to FIGS. 1, 3 and 5 in this connection for inverted Schering-bridge use of the testing instrument 1. The transformer potentials may be varied, of course, to obtain the desired test voltage, a dial 22 (FIG. 1) serving this purpose.

The insulation to be tested, here indicated as a condenser $C_1$, and a standard no-loss condenser $C_2$ are respectively connected in adjacent arms of the bridge 20 between the grounded junction 21 and the third and fourth junctions 24, 25. Of the remaining two bridge arms, one contains a variable resistor $R_3$, and the other a fixed resistor $R_4$ shunted by a variable condenser $C_4$, both in series with a reactor $L_4$. A switch 26, in parallel with $L_4$, controls its effectiveness.

The bridge balance conductor 27 is connected to an indicating instrument 28 (FIG. 10).

Figure 2:
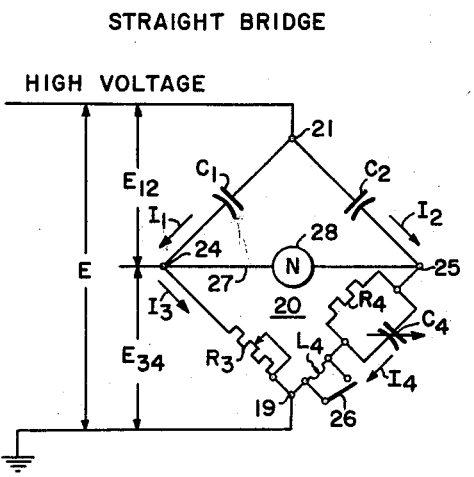
FIG. 2 is a diagrammatic view of a straight Schering-bridge measuring circuit.

The bridge 20, above described, is of the so-called Schering-bridge type, but is inverted with respect to the usual Schering connections, and includes the inductance $L_4$. The usual Schering connections are shown in United States Patent 1,166,159, issued December 28, 1915, to Phillips Thomas, and assigned to the Westinghouse Electric Corporation. In the so-called Schering bridge, the junction 19 (FIG. 3) would be at ground potential and the junction 21 at test potential, as shown in FIG. 2. Consequently, the potentials are inverted, as shown in FIGS. 1, 3 and 5, because the test specimen $C_1$ usually has one side grounded when in service, and because of such inversion it is unnecessary to break such a ground connection, that is, the specimen $C_1$ may be tested in its service position. FIGS. 2 and 3, respectively, show the straight and inverted Schering-bridge arrangements.

On the switching panel 10 of FIG. 9, the four adjusting pointers 30 are used to vary the resistance of $R_3$ and indicate the effective value of such resistance. The four adjusting pointers 31 vary and indicate the effective capacitance $C_4$. The indicating instrument 28, for indicating the bridge balance, has its sensitivity controlled by a knob 32, as hereinafter described. The amplifier 33 may be of any desired type, but preferably is quite sensitive, and is tuned for maximum sensitivity at 60 cycles, so that harmonics do not affect the balance. The balance indicator 28 is extremely sensitive so that a very fine balance can be obtained, even at low applied voltage, such as the order of 5,000 volts.

FIGS. 4 and 5, respectively, show the connections for straight and inverted-bridge operation of the portable testing instrument 1. With reference to FIG. 4, it will be noted that the bridge casing 4 has disposed interiorly therewithin an inner metallic bridge shielding casing 34, which is at the same potential as the first junction point 19 of the bridge circuit 20. The bridge shielding casing 34 has a shielding portion 34a (FIG. 5), which may be of metallic braid, or the like, constituting a part of the shielded cable 13, when the instrument is used for inverted Schering-bridge operation, as shown in FIG. 5. The shield 34a encloses the high-voltage test lead 35 connected to the test specimen 2. For straight Schering-bridge use, as shown in FIG. 4, a shielded cable 13a is employed having a braided metallic shield, or the like, 37, which is at the grounded potential of the outer metallic bridge casing 4.

A removable ground cable 38 electrically grounds the upper bridge casing 4 with the lower power-supply casing 5. As shown in FIG. 1, a ground cable 39 grounds the upper outer casing 4.

The lower power-supply casing 5 is preferably a metallic casing continuously grounded by the cables 38, 39. The standard no-loss condenser $C_2$ is enclosed within the lower metallic casing 5 and comprises, with reference to FIG. 4, a pair of high-voltage plates 41, 42 and a low-voltage plate 43. To have a no-loss condenser $C_2$ there must not be any leakage current from the high-voltage plates 41, 42 to the low-voltage plate 43. An important feature of the present invention is the provision of shielding plates 45, 46 for the standard no-loss condenser $C_2$ comprising the plates 41–43. As more clearly described hereinafter, these shielding plates 45, 46 prevent any leakage current going through the bridge circuit 20. Suitable standoff insulators 48–52 are utilized to support the several condenser and shielding plates.

Converting switches 54–56 are additionally utilized for rearranging the electrical connections for converting from a straight Schering-bridge connection to an inverted Schering-bridge connection, as illustrated, respectively, in FIGS. 4 and 5 of the drawings.

Conversion switches 54, 55 are mechanically operated together on the same shaft having an external manually operable handle 90.

As a matter of convenience, the conversion switch 56 may assume the form of a grounding jack associated with the upper end of cable 13a, which electrically interconnects the grounding shield 37 with the instrument shield 34. This provides the same connection as shown by the closed switch 56 in FIG. 4. For inverted Schering-bridge use, as shown in FIG. 5, a different cable 13 is used which does not afford such a grounded connection.

For straight Schering-bridge operation, as shown in FIG. 4, an additional shielded testing cable 57 is employed. As shown in FIG. 4, the shielded cable 57 comprises a test lead 58 and an outer braided shield, or the like, 59, the latter being electrically connected to the grounded casing 5. In addition, a shielded cable 60, comprising a conductor 61 and a shield 62, electrically interconnect the contact 55a of conversion switch 55 with fourth junction 25 of the bridge circuit 20.

For straight Schering-bridge use, as shown in FIG. 4, high voltage from the transformer 16 passes to the test specimen $C_1$ through the lead 58. The connection from the low-voltage side of the test specimen $C_1$ is to the $R_3$ bridge arm through test lead 35. Shielding 37, 59 and 62 is all connected to the grounded casings 4, 5. High voltage also passes to standard condenser plates 41, 42 through connection 63, contact 54a of closed conversion switch 54, and bridging lead 64. There is also a connection between the low-voltage plate 43 of standard condenser $C_2$ through lead 66, switch 55, contact 55a, shielded lead 61 to fourth junction 25 of the bridge circuit 20.

With such an arrangement it will be noted that any leakage current from plate 41 over insulator 50, plate 45 and insulator 49 will be diverted to ground by diversion plate 67 and connection 68. This leakage current is carried back to the high-voltage transformer 16 at the connection 69. Any leakage current from plate 42 over insulator 51, plate 46 and insulator 52 is likewise taken to ground and back to the transformer 16 without going through the bridge circuit 20. As a result, only the capacitance current of $C_2$ passes through the bridge arms.

For inverted Schering-bridge use, as shown in FIG. 5, it will be observed that high voltage from the transformer 16 is taken to junction 19 of the bridge circuit 20 through leads 63 and 70. High voltage from third junction 24 of bridge circuit 20 is also taken to the test specimen $C_1$ through lead 35. The shielding case 34 is connected to high voltage by lead 71. Leads 35 and 72 are shielded by high-voltage shields 34a and 34b. Additional grounding layers 73, 74 are employed in conjunction with the shielding cables 12, 13 largely for psychological effects, but are not necessary as there is provided insulating coverings over the high-voltage shields 34a, 34b. High voltage is taken from the fourth junction 25 of the bridge 20 by means of lead 72 to the high-voltage standard condenser plates 41, 42. The standard condenser plate 43 is connected to ground by lead 66 and switch 55, which is now closed to make contact with terminal 55b and ground. Standard condenser shield plates 45, 46 are connected to high voltage by jumper 75 and shield 76, which, in turn, is connected to high-voltage shield 34b.

To have a no-loss condenser $C_2$, there must not be any current leakage from plates 41, 42 to ground or to plate 43. Since the voltage applied to shield plates 45, 46 is practically the same in magnitude and phase relation as the voltage applied to the standard condenser plates 41, 42, there will be no tendency for any leakage current to flow from plates 41, 42 across insulators 50, 51 to plates 45, 46 and on to ground. Therefore, the only current from plates 41, 42 to plate 43 will be the capacitance current of $C_2$.

In operation with the inverted bridge arrangement, as shown in FIGS. 1, 3 and 5, with the test lead 35 connected to the specimen 2, the amplifier 33 energized and the instrument sensitivity resistor 32 at its lowest point of adjustment, the cord 14 from the low-voltage source may be plugged in the socket 78 (FIG. 9). The transformer 16 is thereby energized, and the high-voltage test potential is impressed upon the bushing 2 through the bridge circuit 20. The bridge 20 may then be balanced by adjusting the resistor $R_3$ and condenser $C_4$ to obtain a null reading on the milliammeter 28, the sensitivity control 32 being operated to maintain the indications of the milliammeter 28 within the limits of the scale. By reason of the plurality of dial switches 30, 31 for $R_3$ and $C_4$, a desired accuracy of reading may be obtained of the values of these quantities required to balance the bridge.

When the bridge 20 is balanced, as indicated by the milliammeter 28, the values of $R_3$ and $C_4$, as read from the dials, are measures, respectively, of the capacity of the terminal bushing 2 in microfarads, and the power-factor of the bushing 2. That is, when the bridge is balanced, the following formulae obtain:

$$\frac{C_4}{10} = \cot \theta \qquad (1)$$

and $$C_1 = C_2 \frac{R_4}{R_3} \qquad (2)$$

Cot $\theta$ is, for all practical purposes, equal to cos $\theta$, which is the power-factor expression, and, in (2), $C_2$ and $R_4$ being constant, the capacity of the specimen is readily obtained from the reading of $R_3$. It is assumed that the series capacitance and parallel capacitance of the specimen 2 are equal for all practical purposes.

The proofs of the above formulae and statements are not given here, in the interest of brevity, but are well understood by those skilled in the art.

From the foregoing, it will be apparent that by the ready manipulation of the conversion switches 54–56, and by the use of different plug-in cable connections 11, 12, 13, 13a, 57 and 60, the portable-type instrument 1 may quickly be adapted to either straight or inverted-bridge use, as desired.

Below the grounded switching panel 10, yet insulatedly supported therefrom, is the box-shaped shield 34 enclosing and shielding the bridge elements, including the resistances, capacitances and inductance, together with the amplifier 33 and the battery therefor—all being shielded from leakage currents.

Insulating shafts from the pointers 30, 31 extend into the shield 34 and control the values of the resistances and capacitances disposed interiorly of the box-shaped shield 34.

By removing a lower grounded cover on the upper instrument section, opening a door in the bottom of the inner box-shaped shield 34 and disconnecting a few leads, the top 34d only of the shield box 34 may be removed upwardly with the grounded switching panel 10 carrying with it the resistances and capacitances for ready external servicing.

FIGS. 6 and 7 show a modified type structural arrangement indicating how a straight and inverted Schering-bridge combination can be used with two separate standard condensers $C_2^1$ and $C_2^2$ instead of a single condenser $C_2$, as shown in FIGS. 1, 4 and 5. One standard condenser $C_2^2$ has one side connected to ground. The other side of the condenser $C_2^2$ is arranged for connecting to high voltage. This side is also arranged to be shielded with a shield 80 at high voltage. The second condenser $C_2^1$ has one side connected to the high-voltage transformer lead 81. The other side of this condenser $C_2^1$ is arranged for connecting to a low-voltage lead 82 and is shielded with a shield 83 at ground potential.

FIG. 8 shows how the bridge instrument 1 of the present invention can be used with an external transformer 16a and with an external standard condenser $C_2$ to test a specimen $C_1$ at extra-high voltage.

From the foregoing description of the invention it will be apparent that there is provided an improved, lightweight, portable dielectric testing instrument adapted for field use and capable of quick conversion from straight to inverted-bridge use.

Also, importantly, adequate shielding is provided to prevent leakage current entering the bridge 20 and rendering the reading of indicator 28 inaccurate.

Although there have been illustrated and described specific testing instruments, it is to be clearly understood that the same were merely for the purpose of illustration, and that changes and modifications may readily be made therein by those skilled in the art without departing from the spirit and scope of the appended claims.

I claim as my invention:

1. A portable testing device for measuring the power factor and capacitance of a grounded or ungrounded insulating specimen comprising, in combination, a Schering-bridge circuit including adjustable impedances, connected in first and second arms of the bridge circuit and joined at a first junction point, a current-balance indicator, said bridge circuit having a condenser of fixed capacity in the third arm thereof, said bridge circuit having cable-connecting means for connecting the insulating specimen in the fourth arm thereof, said third and fourth arms of the bridge circuit meeting at a second junction point, a high-voltage source for impressing high testing voltage across the first and second junction points, means including a control panel for adjusting said adjustable impedances for balancing the bridge circuit so that no current will flow through the current-balance indicator, a metallic shielding casing enclosing said first and second bridge arms together with the current-balance indicator and electrically connected to said first junction point, said condenser of fixed capacity having high- and low-voltage electrode plates, two-positional conversion switching means for adapting the testing device alternatively from straight to inverted Schering-bridge operation, the first position of said conversion switching means connecting high-testing voltage from said high-voltage source to the high-voltage electrode plates of the fixed-capacity condenser and also connecting the low-voltage plates of said condenser to the current-balance indicator, the second position of said two-positional conversion switching means connecting high testing voltage from said high-voltage source to said first junction point and the low-voltage electrode plates of the fixed-capacity condenser to ground, and means for grounding said metallic shielding casing in the first position of the two-positional conversion switching means.

2. A portable testing device for measuring the power factor and capacitance of a grounded or ungrounded insulating specimen comprising, in combination, a Schering-bridge circuit including adjustable impedances connected in first and second arms of the bridge circuit and joined at a first junction point, a current balance indicator, said bridge circuit having a condenser of fixed capacity in the third arm thereof, said bridge circuit having cable connecting means for connecting the insulating specimen in the fourth arm thereof, said third and fourth arms of the bridge circuit meeting at a second junction point, a high-voltage source for impressing high testing voltage across the first and second junction points, means including a control panel for adjusting said adjustable impedances for balancing the bridge circuit so that no current will flow through the current balance indicator, a metallic shielding casing enclosing said first and second bridge arms together with the current balance indicator and electrically connected to said first junction point, said condenser of fixed capacity having high- and low-voltage electrode plates, said testing device being a dual-sectional test unit, one container section being grounded and enclosing the high-voltage source and the fixed-capacity condenser, the other container section also being grounded and having spaced therewithin the metallic shielding casing, with the said control panel being visible from one end of the container section, two positional conversion switching means for adapting the testing device alternatively from straight to inverted Schering-bridge operation, the first position of said conversion switching means connecting high-testing voltage from said high-voltage source to the high-voltage electrode plates of the fixed-capacity condenser and also connecting the low-voltage plates of said condenser to the current balance indicator, the second position of said two-positional conversion switching means connecting high testing voltage from said high-voltage source to said first junction point and the low-voltage electrode plates of the fixed-capacity condenser to ground, and means for grounding said metallic shielding casing in the first position of the two-positional conversion switching means.

3. A portable testing device for measuring the power factor and capacitance of a grounded or ungrounded insulating specimen comprising, in combination, a Schering-bridge circuit including adjustable impedances connected in first and second arms of the bridge circuit and joined at a first junction point, a current balance indicator, said bridge circuit having a condenser of fixed capacity in the third arm thereof, said bridge circuit having cable connecting means for connecting the insulating specimen in the fourth arm thereof, said third and fourth arms of the bridge circuit meeting at a second junction point, a high-voltage source for impressing high testing voltage across the first and second junction points, means including a control panel for adjusting said adjustable impedances for balancing the bridge circuit so that no current will flow through the current balance indicator, a metallic shielding casing enclosing said first and second bridge arms together with the current balance indicator and electrically connected to said first junction point, said condenser of fixed capacity having high- and low-voltage electrode plates, said fixed-capacity condenser having a shield plate for the high-voltage electrode plates, a detachable connecting cable connecting the metallic shielding casing of one container section with said shield plate, said testing device being a dual-sectional test unit, one container section being grounded and enclosing the high-voltage source and the fixed-capacity condenser, the other container section also being grounded and having spaced therewithin the metallic shielding casing, with the said control panel being visible from one end of the container section, two positional conversion switching means for adapting the testing device alternatively from straight to inverted Schering-bridge operation, the first position of said conversion switching means connecting high-testing voltage from said high-voltage source to the high-voltage electrode plates of the fixed-capacity condenser and also connecting the low-voltage plates of said condenser to the current balance indicator, the second position of said two-positional conversion switching means connecting high testing voltage from said high-voltage source to said first junction point and the low-voltage electrode plates of the fixed-capacity condenser to ground, and means for grounding said metallic shielding casing in the first position of the two-positional conversion switching means.

4. A portable testing device for measuring the power factor and capacitance of a grounded or ungrounded insulating specimen comprising, in combination, a Schering-bridge circuit including adjustable impedances connected in first and second arms of the bridge circuit and joined at a first junction point, a current balance indicator, said bridge circuit having a condenser of fixed capacity in the third arm thereof, said bridge circuit having cable connecting means for connecting the insulating specimen in the fourth arm thereof, said third and fourth arms of the bridge circuit meeting at a second junction point, a high-voltage source for impressing high testing voltage across the first and second junction points, means including a control panel for adjusting said adjustable impedances for balancing the bridge circuit so that no current will flow through the current balance indicator, a metallic shielding casing enclosing said first and second bridge arms together with the current balance indicator and electricaly connected to said first junction point, said condenser of fixed capacity having high- and low-voltage electrode plates, two positional conversion switching means for adapting the testing device alternatively from straight to inverted Schering-bridge operation, the first position of said conversion switching means connecting high-testing voltage from said high-voltage source to the high-voltage electrode plates of the fixed-capacity condenser and also connecting the low-voltage plates of said condenser to the current balance indicator, the second position of said two-positional conversion switching means connecting high testing voltage from said high-voltage source to said first junction point and the low-voltage electrode plates of the fixed-capacity condenser to ground, means for grounding said metallic shielding casing in the first position of the two-positional conversion switching means, and the last-mentioned means for grounding the metallic shielding casing in the first position of the two-positional conversion switching means comprising a grounding jack connected to the end of the test cable leading to the insulating specimen.

References Cited by the Examiner
UNITED STATES PATENTS

| | | | |
|---|---|---|---|
| 2,130,865 | 9/38 | Watts et al. | 324—54 |
| 2,333,532 | 11/43 | Frakes et al. | 324—54 |
| 2,773,226 | 12/56 | Brooks | 317—242 |
| 2,922,936 | 1/60 | Behn et al. | 317—242 |

OTHER REFERENCES

Publication: The Schering Bridge, Chap. IV, Sec. 12, pages 352–372, Alternating Current Bridge Methods, by B. Hague, Fourth Edition.

WALTER L. CARLSON, *Primary Examiner.*